United States Patent
Bigler et al.

(10) Patent No.: US 7,731,020 B2
(45) Date of Patent: Jun. 8, 2010

(54) CONVEYOR WITH ATTACHMENTS

(75) Inventors: Jeremy M Bigler, Landisville, PA (US); Ryan Van Duyn, Lancaster, PA (US); Francis B Fatato, Exton, PA (US)

(73) Assignee: Fenner U.S., Inc., Manheim, PA (US)

( * ) Notice: Subject to any disclaimer, the term of this patent is extended or adjusted under 35 U.S.C. 154(b) by 0 days.

(21) Appl. No.: 12/043,655

(22) Filed: Mar. 6, 2008

(65) Prior Publication Data

US 2008/0217141 A1    Sep. 11, 2008

Related U.S. Application Data

(60) Provisional application No. 60/893,139, filed on Mar. 6, 2007.

(51) Int. Cl.
*B65G 13/02* (2006.01)
(52) U.S. Cl. .................................... 198/850; 198/699.1
(58) Field of Classification Search ......... 198/850–853, 198/699.1
See application file for complete search history.

(56) References Cited

U.S. PATENT DOCUMENTS

| 72,181 | A | 12/1867 | Fountain |
|---|---|---|---|
| 1,177,664 | A | 4/1916 | Vuilleumier |
| 1,182,933 | A | 5/1916 | Schulte |
| 1,377,450 | A * | 5/1921 | Whipple ..................... 474/236 |
| 1,438,566 | A | 12/1922 | Wiggins |
| 1,519,165 | A | 12/1924 | Pilliner |
| 2,969,686 | A | 1/1961 | Runton |
| 3,154,960 | A | 11/1964 | Creswell |
| 3,154,961 | A | 11/1964 | Creswell |
| 3,269,523 | A | 8/1966 | Creswell |
| 3,288,273 | A | 11/1966 | Michaelson et al |
| 3,345,113 | A | 10/1967 | Siber |
| 3,387,500 | A | 6/1968 | Hutzenlaub et al |
| 3,418,862 | A | 12/1968 | Hurbis |
| 3,559,796 | A * | 2/1971 | Marks et al. ................. 198/692 |
| 3,857,478 | A | 12/1974 | Meeusen |
| 3,991,632 | A | 11/1976 | Stephens |
| 4,015,038 | A | 3/1977 | Romanski et al. |

(Continued)

FOREIGN PATENT DOCUMENTS

EP    1625087    2/2006

(Continued)

OTHER PUBLICATIONS

U.S. Appl. No. 11/277,301, *Link Belt Assembly and Method for Producing Same*, filed Mar. 23, 2006.

*Primary Examiner*—Mark A Deuble
(74) *Attorney, Agent, or Firm*—Stephen H. Eland; Dann, Dorfman, Herrell & Skillman

(57) ABSTRACT

A conveyor assembly is provided, which includes a link belt formed of a plurality of overlapping belt links. A plurality of engagement elements are attached to the link belt to form an upper surface. In one embodiment, the link belt includes a plurality of apertures and the engagement elements comprises connectors that cooperate with the apertures to connect the engagement elements to the link belt. The upper surface of the engagement elements may be configured in a variety of forms. In one embodiment, the engagement elements comprise a protuberance that projects upwardly to form a point of limited contact.

23 Claims, 4 Drawing Sheets

U.S. PATENT DOCUMENTS

| | | |
|---|---|---|
| 4,028,956 A | 6/1977 | Thompson |
| 4,055,265 A | 10/1977 | Eiserman |
| 4,167,999 A * | 9/1979 | Haggerty ............... 198/851 |
| 4,342,809 A | 8/1982 | Newell |
| 4,377,365 A | 3/1983 | Layh |
| 4,458,809 A | 7/1984 | White et al. |
| 4,526,637 A | 7/1985 | Long |
| 4,550,823 A | 11/1985 | Gladish |
| 4,588,073 A | 5/1986 | Abell |
| 4,675,229 A | 6/1987 | Westhead |
| 4,688,615 A | 8/1987 | Lee |
| 4,886,156 A | 12/1989 | Records et al. |
| 4,903,824 A | 2/1990 | Takahashi |
| 4,922,304 A | 5/1990 | Gilbert et al. |
| 4,925,013 A | 5/1990 | Lapeyre |
| 4,957,199 A | 9/1990 | Wokke et al. |
| 4,994,133 A | 2/1991 | Oizumi et al. |
| 5,011,003 A | 4/1991 | Gladding |
| 5,048,809 A | 9/1991 | Tebbe et al. |
| 5,176,246 A | 1/1993 | Wiggers et al. |
| 5,219,065 A * | 6/1993 | Hodlewsky et al. ......... 198/853 |
| 5,267,596 A | 12/1993 | Logar et al. |
| 5,281,189 A | 1/1994 | Agnoff |
| 5,332,786 A | 7/1994 | Nagata et al. |
| 5,361,893 A | 11/1994 | Lapeyre et al. |
| 5,507,383 A | 4/1996 | Lapyere et al. |
| 5,564,558 A | 10/1996 | Hampton et al. |
| 5,582,287 A | 12/1996 | Heit et al. |
| 5,658,634 A | 8/1997 | Ragland et al. |
| 5,667,058 A | 9/1997 | Bonnet |
| 5,853,849 A | 12/1998 | Nishio et al. |
| 5,984,082 A | 11/1999 | Geib |
| 6,062,379 A * | 5/2000 | Geib et al. ............... 198/844.1 |
| 6,173,831 B1 | 1/2001 | Grabscheid et al. |
| 6,318,544 B1 | 11/2001 | O'Connor et al. |
| 6,565,689 B2 | 5/2003 | Geib et al. |
| 6,770,004 B1 | 8/2004 | Lofgren et al. |
| 6,874,617 B1 | 4/2005 | Layne |
| 7,004,311 B2 | 2/2006 | Fatato et al. |
| 7,216,759 B2 * | 5/2007 | Rau et al. ............... 198/853 |
| 7,241,354 B2 | 7/2007 | Fatato et al. |
| 7,252,191 B2 * | 8/2007 | Ozaki et al. ............... 198/779 |
| 2001/0052451 A1 * | 12/2001 | Ruoss et al. ............... 198/853 |
| 2005/0077153 A1 * | 4/2005 | Krischer ............... 198/851 |

FOREIGN PATENT DOCUMENTS

| | | |
|---|---|---|
| JP | 59-97345 | 6/1984 |
| WO | 2004/069697 | 8/2004 |

* cited by examiner

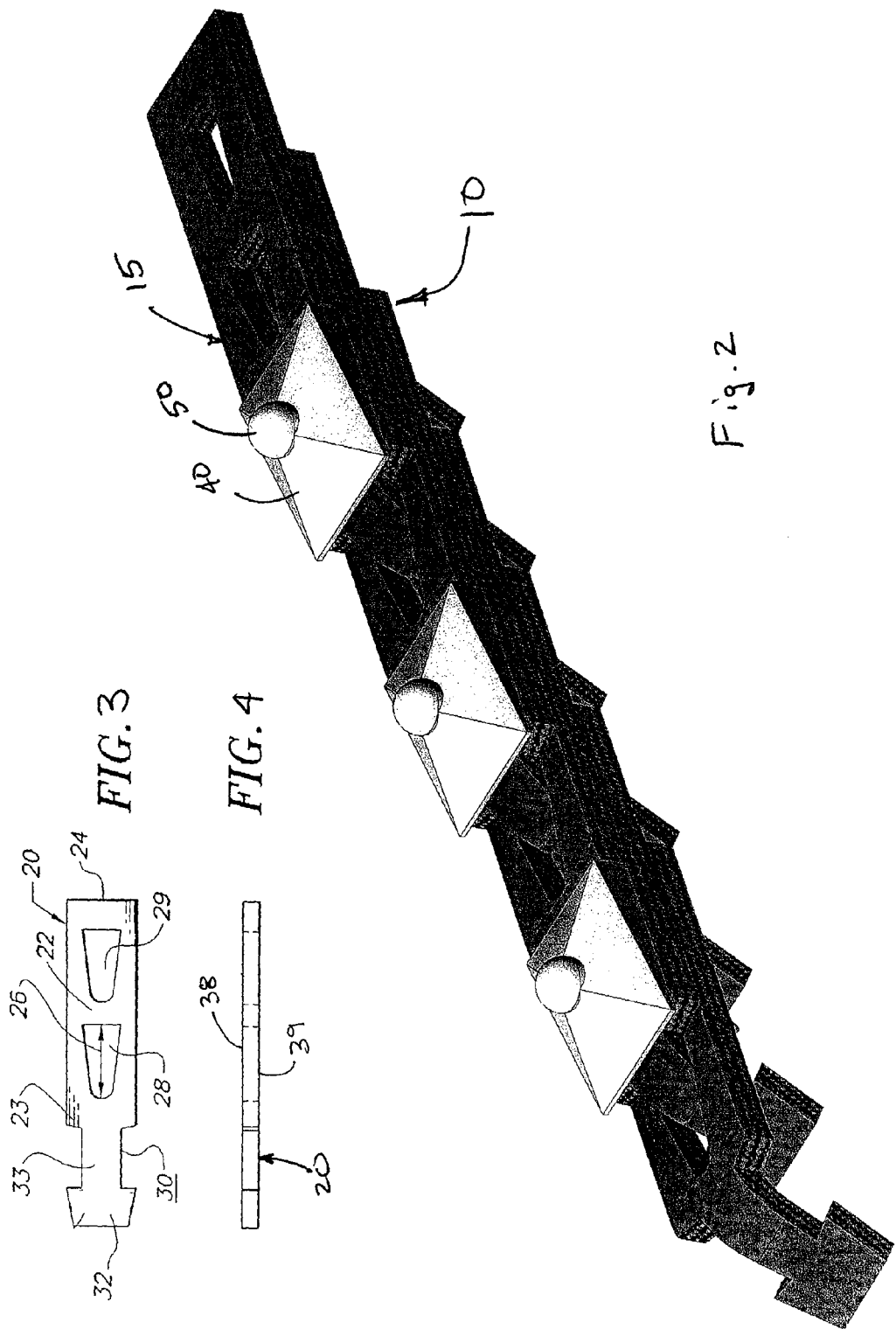

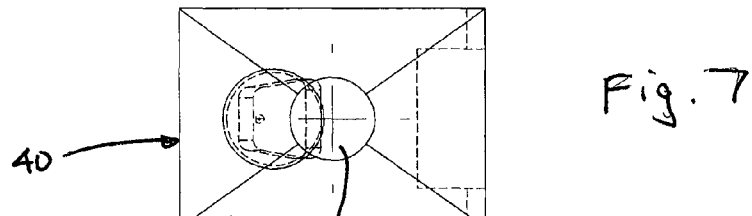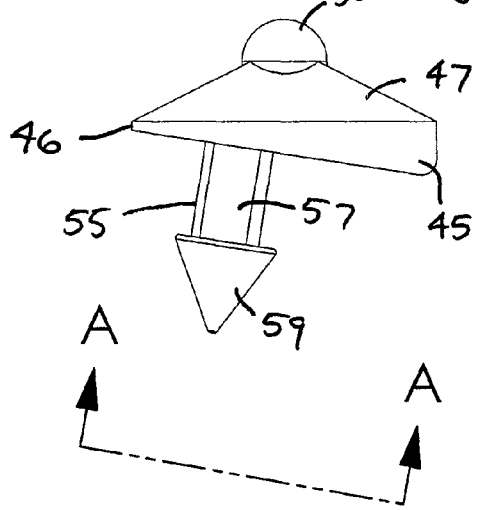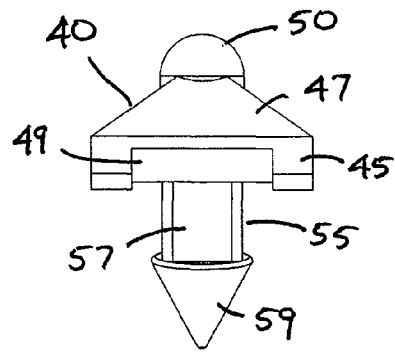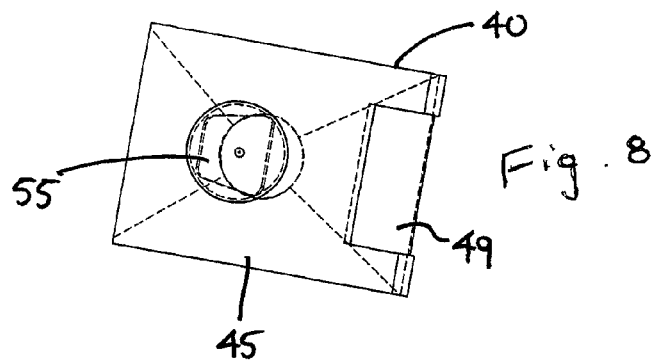

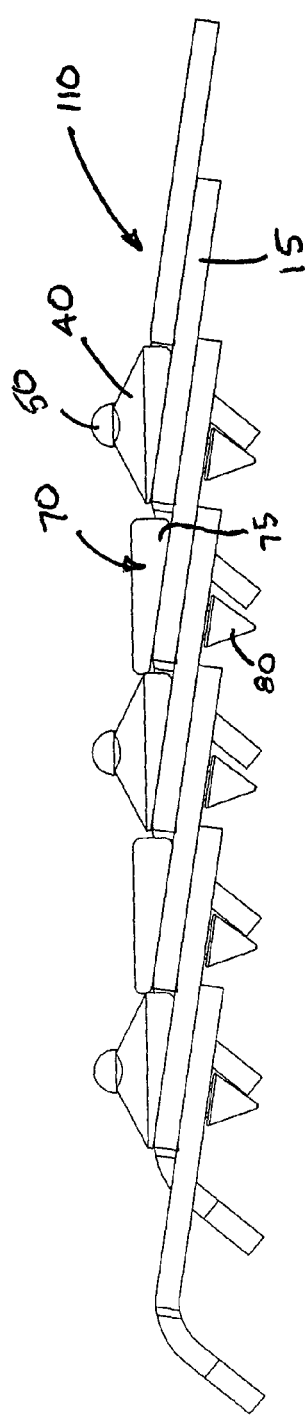
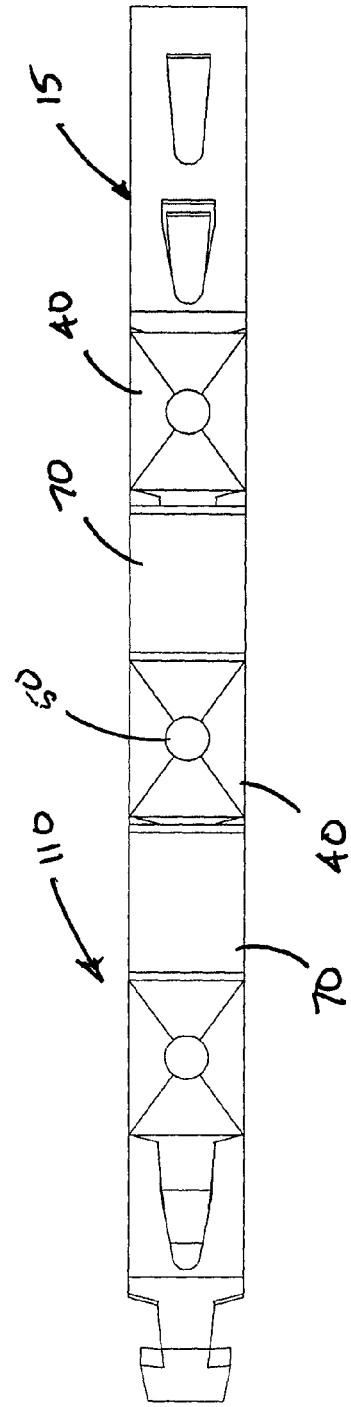

US 7,731,020 B2

CONVEYOR WITH ATTACHMENTS

PRIORITY CLAIM

The present application claims priority under 35 U.S.C. §119 to U.S. Provisional Patent Application No. 60/893,139 filed Mar. 6, 2007, which is hereby incorporated herein in its entirety.

FIELD OF THE INVENTION

The present invention relates to interlocking-link conveyor belts and has particular application for belts that require specialized handling.

BACKGROUND OF THE INVENTION

Interlocking link belts are used in a variety of applications. In some applications, a material being conveyed requires special handling. For instance, in some applications it is desirable to minimize the contact between the belt and the material being handled. It can become cost prohibitive to design a different link belt for each different application. Accordingly, it is desirable to develop a link belt system that can be readily modified to address the varying requirements of different applications.

SUMMARY OF THE INVENTION

In light of the foregoing, the present invention provides an interlocking link belt having one or more attachments that interlock with the links. The attachments can be readily attached or detached from the link belt. Additionally, the attachments can be configured to address a variety of differing circumstances.

BRIEF DESCRIPTION OF THE DRAWINGS

The foregoing summary and the following detailed description of the preferred embodiments of the present invention will be best understood when read in conjunction with the appended drawings, in which:

FIG. 2 is a perspective view of a portion of the conveyor assembly illustrated in FIG. 1;

FIG. 3 is an enlarged plan view of a link of link belt in the conveyor assembly illustrated in FIG. 1;

FIG. 4 is a front side view of the link illustrated in FIG. 3;

FIG. 5 is an enlarged front side view of an attachment element of the conveyor assembly illustrated in FIG. 1;

FIG. 6 is a right side view of the attachment element illustrated in FIG. 5;

FIG. 7 is a plan view of the attachment element illustrated in FIG. 6;

FIG. 8 is a bottom view of the attachment element illustrated in FIG. 7;

FIG. 9 is a side elevational view of a portion of an alternate conveyor assembly; and FIG. 10 is a plan view of the conveyor assembly illustrated in FIG. 9.

DETAILED DESCRIPTION OF THE INVENTION

Figure 1:
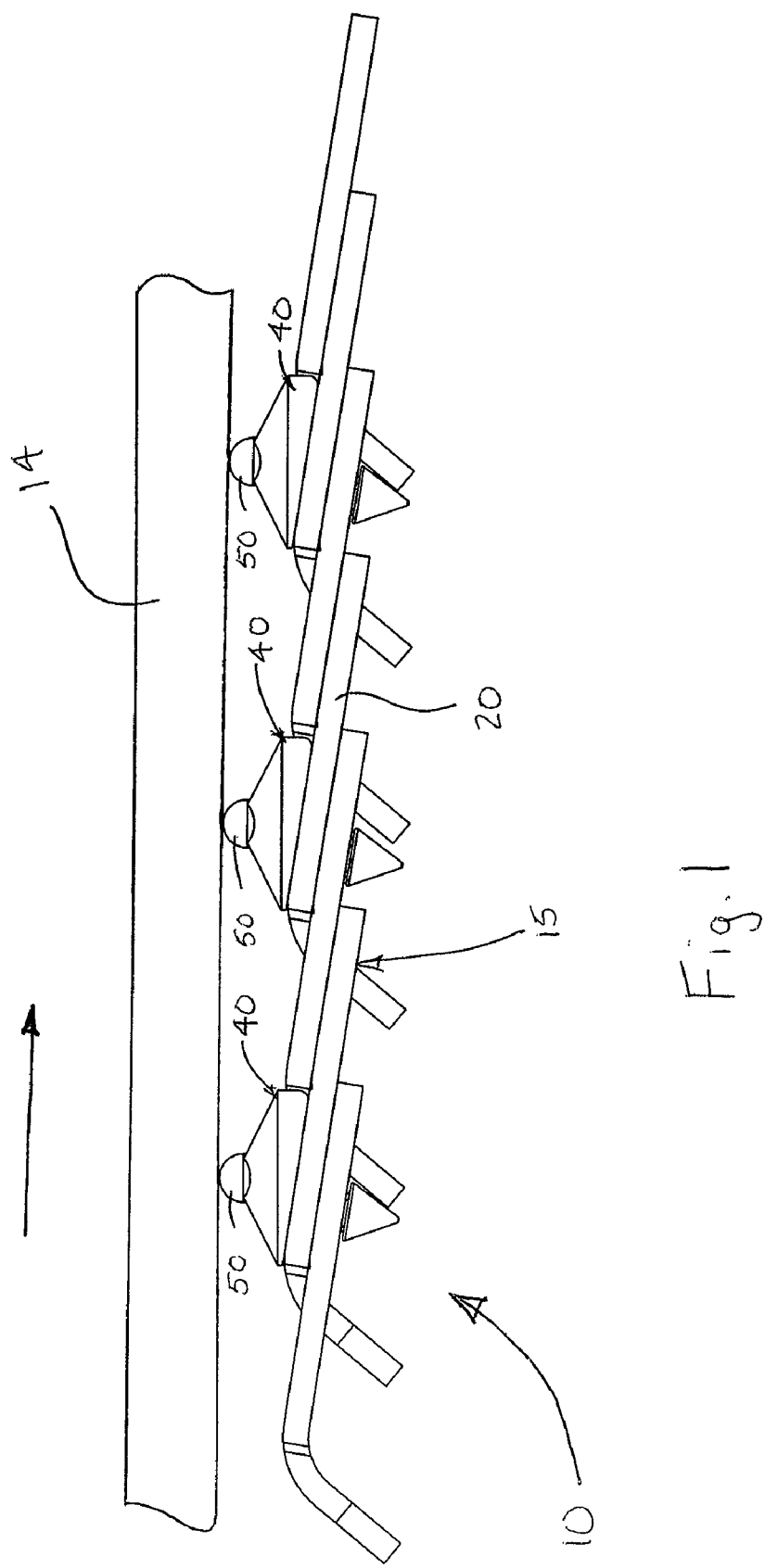
FIG. 1 is a conveyor assembly conveying a workpiece.

Referring now to the figures, wherein like elements are numbered alike throughout, a conveyor system is designated generally 10. The conveyor system 10 comprises an interlocking link belt 15 and a plurality of interlocking attachments 40. The assembly 10 is shown transporting a workpiece 14.

The belt 15 comprises a series of interlocking belt links 20. Connected to the belt, the attachments 40 provide minimal contact points between the belt 15 and the workpiece 14.

One of the individual links that comprise belt 15 is illustrated in FIGS. 3 and 4. Each belt link 20 has a body portion 22 and a fastener 30 connected to the body portion. In the present instance, the thickness of the belt link 20 between the top surface 38 and the bottom surface 39 is substantially uniform throughout the entire link.

The body portion 22 is generally rectangular, having two edges extending longitudinally between a trailing end 23 and a leading end 24, both of which extend transversely between the two edges. Adjacent leading end 24 a leading aperture 29 extends through the thickness of body portion 22. Longitudinally spaced from the leading aperture 29 adjacent the trailing end 23, a trailing aperture 28 extends through the thickness of body portion 22.

The leading end 24 corresponds to the direction in which the assembly 10 travels as shown by the arrow in FIG. 1. However, the direction in which the assembly 10 travels can be reversed so that the leading end 24 does not lead the trailing end 23 with respect to the actual travel of the assembly.

The fastener 30 integrally connects the body portion 22, and comprises a fastening tab 32 and a constricted neck 33. The neck extends longitudinally, with one end connected to the fastening tab 32, and the other end connected to the leading end 23 of body 22. The length of the neck 33 between the trailing end 23 and the fastening tab 32 is sufficiently long to allow the fastening tab 32 to extend through the apertures in two or three belt links 20 depending on the application.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links 20 can properly connect, the apertures are configured and dimensioned with reference to the fastening tab and the neck.

In the present instance, the apertures through body 22 are non-circular. Both apertures 28 and 29 are longitudinally elongated so that their length 26 is greater than their width. To ensure that fastening tab 32 can pass through the apertures, the length of the apertures is greater than the greatest width of the fastening tab 32.

The width of apertures 28 and 29 is not constant. Instead, the apertures widen as they extend toward trailing end 24. To provide proper connection between the belt links 20, the apertures are narrower than the fastening tab width so that the fastening tab 32 cannot pass back through the apertures once the belt links are connected. However, the apertures are wider than the neck 33 to allow the neck to extend through the apertures while the belt links are connected, as will be discussed below.

The belt links 20 are made of a material of sufficient tensile strength to convey the weight of the workpiece 14. In the present instance, the belt links 20 are made of a urethane elastomer that is reinforced with a polyester fabric.

Referring now to FIGS. 5-8, the details of the attachment elements 40 will be described in greater detail. The attachment element 40 comprises a body portion 45, an engagement portion 50 and a connector 55 for connecting the attachment element to the link belt 15. In the present instance, the attachment elements are molded elements, formed of a thermoplastic or thermoset elastomer. However, the attachments elements may be formed from a variety of materials, including ceramic, metal, rubber or plastic materials depending on the application.

The body portion 45 comprises a generally wedge-shaped body that tapers from the trailing edge 46 to the forward edge. In this way, the body has a thicker edge at the leading edge than at the trailing edge. The top surface 47 of the body forms a pyramidal surface.

The engagement surface 50 projects upwardly from the top of the upper surface 47. The engagement surface 50 may be formed in a variety of shapes depending on the application for the belt 10. In the present instance, the engagement surface 50 is a rounded protuberance. More specifically, the engagement surface is a semi-spherical surface.

The bottom surface of the body 45 is generally planar. A notch or pocket 49 is formed in the bottom surface of the body, adjacent the leading edge of the body. The pocket 49 is configured to accommodate a portion of the neck 33 of one of the belt links. Specifically, the pocket has a width that is at least as wide as the width of the neck 33 of a belt link, and the pocket has a depth that is at least as great as the thickness of the neck. In this way, as described below more fully, the bottom surface of the attachment element 40 lies flush against the top surface of a link 20 of the belt, without interfering with the neck 33 of an adjacent belt link.

The connector 55 is a barbed connector that projects downwardly from the bottom surface of the body 45. The connector 55 is configured to connect the attachment element 40 to the belt after the belt links are assembled. The connector comprises a neck 57 and a barb 59 that flares outwardly from the bottom end of the neck. The neck 57 is configured to fit into the apertures of the belt links 20 after the belt links are assembled. Specifically, the upper edge of the barb forms a shoulder configured to confront the bottom surface of the belt. The neck 57 of the connector is elongated so that the length of the neck is at least twice the thickness of the belt links. Additionally, in the present instance, the neck 57 has a central axis that is not aligned with a central axis of the engagement surface 50.

To form a conveyor system 10, a plurality of belt links 20 are connected together to form a link belt 15. More specifically, the belts are connected in successive overlapping relation by inserting the fasteners 30 of preceding links through the apertures 28, 29 of successive links. As shown in FIG. 1, the fastener 30 of each link extends through apertures in two successive links in the present embodiment.

The attachment elements 40 are connected with the belt 15 after the links are assembled to create the belt. To connect an attachment element 40, in the present embodiment, the connector 55 for the attachment element is displaced through a pair of aligned apertures in the belt links similar to the way in which the belt link fasteners extend through the aligned apertures to connect the belt links together. The connector 55 extends through the aligned apertures so that the barb 59 projects from the bottom of the belt, with the top surface of the barb confronting the bottom surface of the belt. The body 45 of the attachment element overlies the top surface of one of the links 20 of the belt. The body of the attachment element 45 is wider than the apertures 28, 29 of the belt links 20, and in the present instance, the body 45 is approximately as wide as the belt 15. Additionally, in the present instance, the attachment element 40 overlies the rearward half of the body 22 of a belt link, including the trailing aperture 28 of the link. The neck 33 of the adjacent preceding link projects into the pocket 49 formed in the bottom of the attachment element.

In this way, as shown in FIGS. 1-2, the attachment element 40 overlies the belt link without any significant gap between the top surface of the belt and the bottom surface of the attachment element. Therefore, the attachment element forms a cover over the forward half of one of the belt links, preventing contaminants from becoming lodged in the aperture, which could cause damage to the belt or the workpiece 14. Additionally, the configuration of the upper surface 47 of the attachment element 40 tends to deflect contaminants away from the engagement surface 50. Specifically, the tapered surfaces of the upper surface taper downwardly and away from the engagement surface 50. The tapered surfaces deflect contaminants away from the engagement surface 50, thereby reducing the likelihood that contaminants, such as pieces from the work piece or other items, will lodge between the belt and the workpiece, causing damage to the workpiece or the belt.

Additionally, as discussed above, the attachment element 40 overlies a substantial portion of one of the belt links 20 of the belt 15. Since the bottom surface of the attachment element is generally planar, the body portion 47 operates as a stop limiting substantial lateral displacement of the attachment element across the width of the belt. In other words, the engagement between the bottom surface of the attachment element 40 and the top surface of the belt link operates to impede the attachment element from rocking relative to the belt.

In some instances, it may be desirable to limit the contact between the belt 15 and the workpiece 14. The attachment elements 40 may be connected with the belt at a desired spacing to reduce the contact with the workpiece 14. In the present instance, the attachment elements 40 are connected to every other link, however, the attachment elements may be connected closer together, such as on every link, or two elements every three links. Alternatively, the elements could be connected further apart, such as every third or fourth link. In this way, the attachment elements 40 provide flexibility so that the user can select the appropriate spacing of the contact points between the conveyor system 10 and the workpiece, and then connect the attachment elements to the belt 15 at the desired spacing.

As shown in FIGS. 1-2, the engagement surfaces 50 of the attachment elements are configured to maintain a substantially constant engagement surface between the workpiece 14 and the conveyor system 10 in the event of displacement of the belt 15 relative to the workpiece. Specifically, in the present instance, the engagement surface 50 is rounded so that if the attachment element 40 rotates relative to the workpiece, the engagement surface contacting the workpiece remains substantially the same. Accordingly, in the present instance, the configuration of the engagement surface 50 minimizes or eliminates stress concentrations that may arise between the conveyor 10 and the workpiece 14 when the attachment elements rotate relative to the workpiece.

Referring now to FIGS. 9-10, an alternate embodiment of the conveyor assembly is designated 110. In the alternate embodiment, the belt 15 and attachment elements 40 are substantially similar to the belt and attachment elements illustrated in FIGS. 1-8 and described above. In the alternate embodiment 110, a second type of attachment element 70 is also attached to the belt. The second attachment elements 70 are flat elements.

The flat elements 70 have a body portion 75 and a barbed connector 80. The barbed connector is configured substantially similar to the barbed connector 55 described above. Additionally, the body portion 75 of the flat elements 70 is similar to the body portion 45 described above. Specifically, the body portion has a generally flat bottom surface having a recess configured to accommodate the neck 33 of a preceding belt link. Additionally, the body portion 75 is a wedge-shaped portion, tapering rearwardly from the leading edge, so that the leading edge of the body is thicker than the trailing edge. In contrast to the upper surface of the attachment elements 40 described above, the flat elements 70 have a substantially flat upper surface.

In the embodiment illustrated in FIGS. 9-10, the flat elements 70 are attached to the belt between the protruding attachment elements 40. In this way, the engagement surfaces 50 of the attachment elements 40 protrude above the upper surface of the flat elements 70 so that there is essentially no contact between the workpiece 14 and the flat elements. Specifically, the workpiece spans adjacent engagement surfaces 50 without contacting the upper surface of the flat elements 70. In this configuration, the flat elements operate as shields covering the top surface of the belt links between the belt links to which the attachment elements 40 are connected. Specifically, in the present instance, the flat elements 70 are substantially coextensive with the exposed portion of the body 22 of one of the links 20 in the belt. Therefore, the flat element 70 overlies the exposed portion of the belt link 20 and also covers the exposed aperture 28. In this way, the flat element 70 prevents contaminants from becoming lodged against the belt 15, particularly within the apertures in the belt, which could cause damage to the belt or the workpiece 14 during operation.

Although the flat elements 70 have been described as having a flat upper surface, it may be desirable to configure the upper surface of the flat elements 70 such that the elements have an angled upper surface such that the upper surface tends to deflect contaminant materials away from the belt. However, in such an embodiment, it is desirable to have the upper surface remain below the height of the engagement surfaces 50 of the attachment elements 40. Therefore, the workpiece will only contact the engagement surfaces 50 of the attachment elements 40 rather than any of the elements attached to the belt intermediate the attachment elements.

In addition to being attached to the belt as described above, the flat elements 70 may be attached to the belt instead of the attachment elements 40 described above. In this way, the flat elements 70 may be attached to each link 20 in the belt, or fewer links if desired. The wedge shaped bodies of the flat elements 70 may be configured so that when the elements are attached to the belt 15, the height of the leading edge of the element is substantially the same as the height of the trailing edge of the element connected to the preceding link of the belt. Configured in this manner, the flat elements may form a series of elements having substantially aligned flat upper surfaces to create a substantially flat profile for the belt.

In the foregoing description, elements are attached to a link belt 15 to alter the exposed surface of the link belt. The first element described is the attachment element 40, which included a protuberance for providing limited contact surface between the link belt and the workpiece 14. The second type of element described above is the flat element 70 for providing a cover or a generally flat engagement surface, depending on the application. As these two examples illustrate, the elements attached to the link belt can incorporate a variety of configurations to accommodate various applications.

In addition to the two configuration described above, alternate designs can be created having differently shaped upper surfaces. In one example, rather than having a flat upper surface as in the flat elements 70, the upper surface can be rounded or domed shape. The rounded shape may be formed so that the rounded surface extends across substantially the entire width of the upper surface, rather than being a rounded protuberance as shown in the attachment element 40 described above. Similarly, rather than being rounded, the upper surface of the attachment elements may be configured to have a reduced area contact surface, such as a pyramid shape or a plurality of small protuberances.

In addition to providing different surface configurations, the attachment elements may provide different material handling characteristics. For instance, the upper surface of an attachment element may include a layer of cushioning material attached to or formed in the body of the attachment element. One example of a cushioning material is a layer of foam that would provide a layer of cushioning, conformability or additional grip. Similarly, a layer or envelope of gel could be added to the top surface to provide a cushioning layer. In this way, the lower portion of the attachment element, such as the fastener 30 and/or the body portion 45 may be formed of one material, while a second material, such as the foam, gel or other type of material forms the surface that engages the work piece.

Other features that could be incorporated into the upper surface of the attachment element include grit materials or other materials that would increase the coefficient of friction of the upper surface. Similarly, elements that protect the work piece could be incorporated into the upper surface. For instance, flock could be applied to the upper surface to provide a low friction and/or non-marring contact surface between the belt and the workpiece.

Further still, rotatable elements can be incorporated into the attachment elements. For example, a roller or wheel can be mounted onto an axle so that the roller is rotatable. The roller can be mounted so that the axle is parallel or normal to the direction of travel of the link belt 15. In this way, the roller can rotate in the same direction as the direction of travel for the belt, or the roller can rotate at an angle (such as normal) to the direction of travel of the belt. In this way, a workpiece can be readily conveyed across the belt, at an angle to the direction of travel of the belt. Similarly, a rotatable ball can be mounted to the top surface of the attachment elements. For instance, a ball, such as a ball bearing, can be mounted in a socket formed on the upper surface of the attachment element. In this way, the ball would be rotatable relative to the work piece to allow the work piece to be easily repositioned relative to the top surface of the conveyor assembly.

Another type of material handling element that may be incorporated into the attachment elements is an elongated finger or rib that may protrude from the upper surface of the attachment elements. For instance, one or more elongated fingers may extend upwardly from the surface of a link configured similarly to the flat elements 70. The fingers may be deformable to form a surface like a brush, or a cushioning or spring-like effect.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A link belt assembly, comprising:
 a link belt formed of a plurality of overlapping links forming an upper surface of the belt formed of the exposed portion of the belt links, wherein the upper surface has a plurality of tapered surface portions each of which extends from a forward edge of the exposed upper portion of a link to the forward edge of an adjacent exposed portion of a belt link; and
 a plurality of engagement elements connected to the link belt to form an upper surface, wherein the engagement elements have a lower surface configured to cooperate with the upper surface of the link belt to impede the engagement elements from rocking relative to the link belt, and wherein the engagement elements comprise a wedge-shaped body configured to overlie a tapered surface portion of the upper surface of the belt.

2. The link belt assembly of claim 1 wherein the links comprise apertures and apertures of adjacent links overlie one another when the belt is assembled, wherein each of the engagement elements comprises a connector that extends through overlying apertures to connect the engagement elements to the link belt.

3. The link belt assembly of claim 1 wherein the engagement elements comprise a wedge-shaped body, wherein the body tapers from front to back with respect to the direction of travel of the belt.

4. The link belt assembly of claim 1, wherein the body extends across a majority of the width of the belt, and wherein the body has a lower surface configured to cooperate with the upper surface of the link belt to impede the engagement elements from rocking laterally across the width of the belt.

5. The link belt assembly of claim 1 wherein the engagement elements comprises a body confronting the upper surface of the link belt, and wherein the links comprise connectors for connecting adjacent links, wherein the connectors create protuberances along the upper surface of the link belt, and wherein the engagement elements each comprise a pocket formed in a lower surface, wherein the pocket is configured to accommodate the protuberances formed by the connectors.

6. The link belt assembly of claim 5 wherein the pocket overlies the protuberance, such that a substantial portion of the engagement element contacts the upper surface of the link belt.

7. The link belt assembly of claim 6 wherein the pocket overlies the protuberance such that a substantial portion of the perimeter of the lower surface of the attachment element contacts the upper surface of the link belt.

8. The link belt assembly of claim 1 wherein the engagement elements comprise a connector formed of a first material and an upper surface formed of a second material that has a characteristic that is substantially different from a characteristic of the first material, wherein the upper surface designed to interoperate with the work piece.

9. The belt link assembly of claim 1 wherein the engagement elements comprise a body portion overlying a substantial portion of an exposed portion of one of the links, and wherein the engagement element comprises an engagement element protruding upwardly from the body portion to form an engagement surface.

10. The belt link assembly of claim 9 wherein the body portion is formed to overlie substantial the width of a link of the belt.

11. The belt link assembly of claim 1 wherein the links comprise apertures and apertures of adjacent links overlie one another when the belt is assembled, wherein each of the engagement elements comprise:
a connector configured to engage aligned apertures of adjacent links to connect the engagement element to the link belt; and
a body portion configured to overlie and cover the aligned apertures to impede contaminants from entering the aligned apertures.

12. The belt link assembly of claim 1 wherein the engagement elements comprise a rotatable element disposed on an upper surface of the engagement elements, wherein the rotatable elements are configured to engage the workpiece.

13. The belt link assembly of claim 1 wherein the engagement elements comprises a first engagement element having a upper surface of a first configuration, and a second engagement element having an upper surface of a second configuration that is different from the first configuration.

14. The belt link assembly of claim 1 wherein the engagement elements have a length that is shorter than the length of the belt links.

15. The belt link assembly of claim 1 wherein the engagement elements comprise a wedge shaped body, and the engagement elements attach to the link belt such that the upper surface of the engagement elements form a substantially flat engagement surface.

16. A link belt assembly, comprising:
a link belt formed of a plurality of overlapping links, wherein the links comprise:
a body having a leading end and a trailing end and an aperture extending through the thickness of the body; and
a fastener having a neck at a trailing end of the link, wherein the link belt is formed by inserting the fastener of one link through the aperture of a subsequent link so that the neck of the fastener protrudes above the surface of the body of the subsequent link; and
a plurality of engagement elements connected to the link belt to form an upper surface, wherein the engagement elements comprise:
a body portion comprising a generally wedge-shaped body that tapers from a trailing edge to a leading edge so that the body of the engagement element has a thicker edge at the leading edge than at the trailing edge;
a relieved portion formed in the bottom surface of the body, adjacent the leading edge of the body, wherein the relieved portion is configured to accommodate a portion of the neck of one of the belt links so that the bottom surface of the engagement element lies substantially flush against the top surface of the link; and
a connector projecting downwardly from the bottom surface of the body wherein the connector is configured to connect the engagement element to the link belt after the belt links are assembled into the belt.

17. The link belt assembly of claim 16 wherein the relieved portion is a pocket.

18. The link belt assembly of claim 16 wherein the relieved portion has a depth that is at least as great as the thickness of the neck.

19. The link belt assembly of claim 16 wherein the relieved portion is configured to allow the engagement element to lie flush against the top surface of the link without interfering with the neck of the preceding link.

20. The link belt assembly of claim 16 wherein the top surface of the body portion of the engagement elements projects upwardly.

21. The link belt assembly of claim 20 wherein the top surface forms a pyramidal surface.

22. The link belt assembly of claim 16 wherein the top surface of the body portion has an engagement surface formed of a rounded protuberance.

23. The link belt assembly of claim 16 wherein the connector of the engagement element is configured to fit into the apertures of the belt links after the belt links are assembled.

* * * * *